July 21, 1931. F. L. GOLDMAN 1,815,251
METHOD OF PRODUCING MOTION PICTURE FILMS
Filed March 7, 1927 2 Sheets-Sheet 1
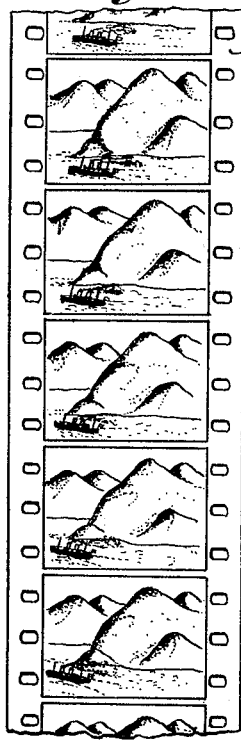
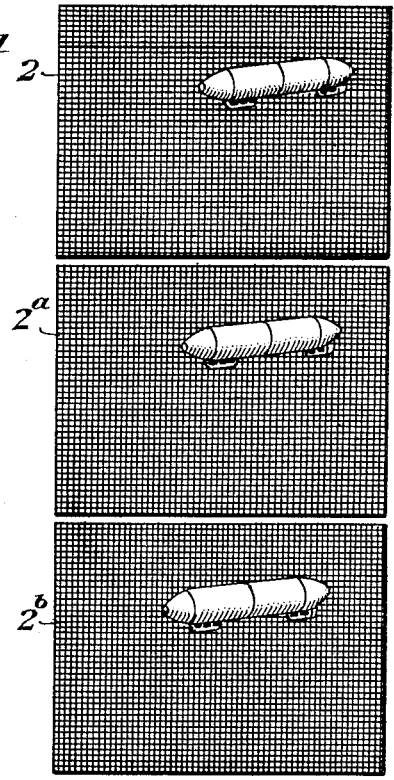
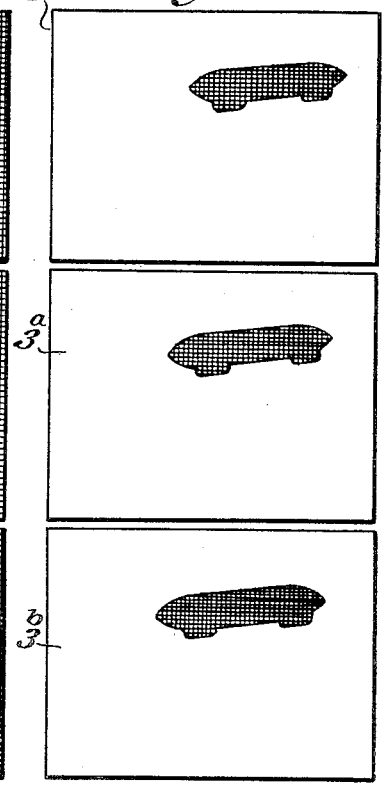
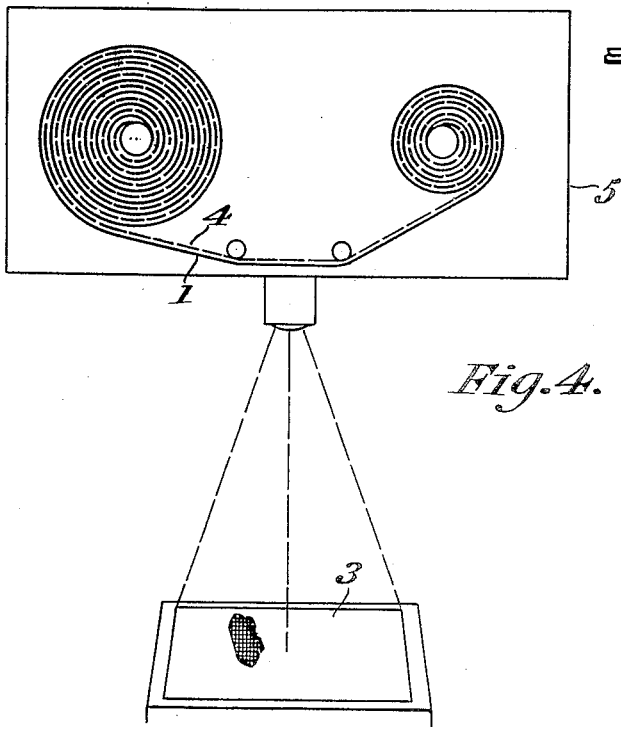
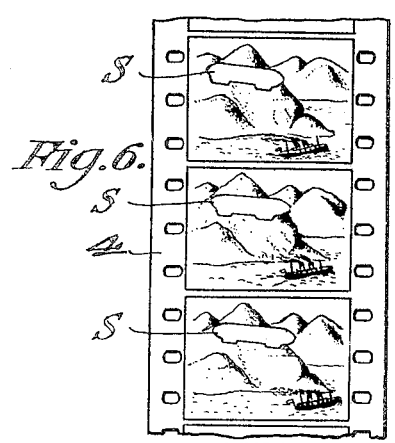
INVENTOR
Frank L. Goldman
BY
ATTORNEYS July 21, 1931.  F. L. GOLDMAN  1,815,251
METHOD OF PRODUCING MOTION PICTURE FILMS
Filed March 7, 1927  2 Sheets-Sheet 2
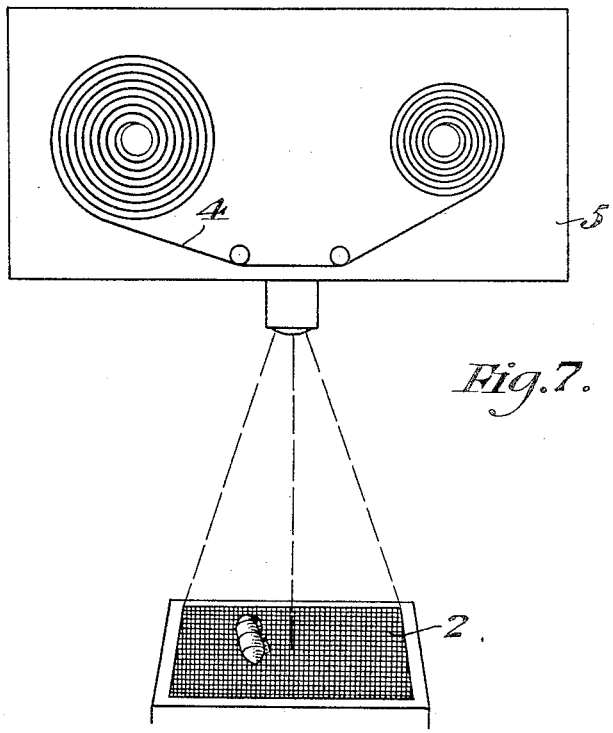
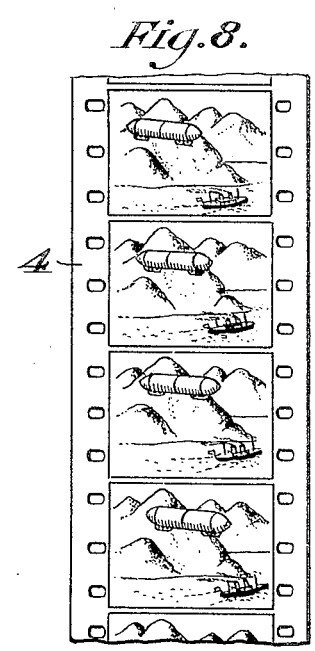
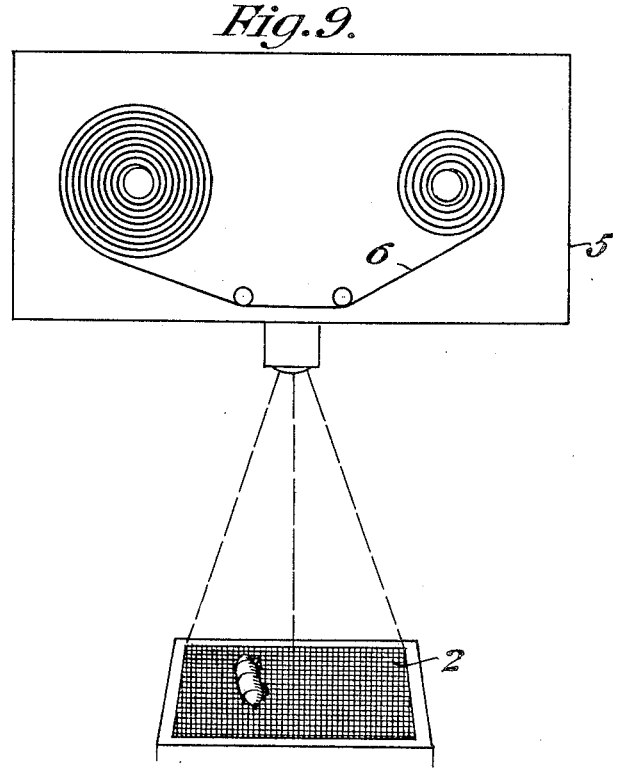
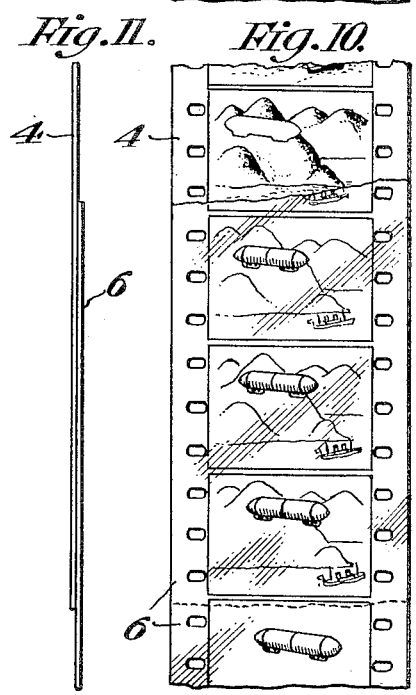
INVENTOR
Frank L. Goldman
BY
ATTORNEYS Patented July 21, 1931

1,815,251

UNITED STATES PATENT OFFICE

FRANK LYLE GOLDMAN, OF MOUNT VERNON, NEW YORK, ASSIGNOR, BY MESNE ASSIGNMENTS, TO AUDIO-CINEMA, INCORPORATED, OF LONG ISLAND CITY, NEW YORK, A CORPORATION OF NEW YORK

METHOD OF PRODUCING MOTION PICTURE FILMS

Application filed March 7, 1927. Serial No. 173,367.

In the production of a projection film for animated pictures, a series of pictures are made representing an object in different positions. The pictures of this series are then photographed in proper sequence and printed upon the film, whereby when the film is projected the object will appear to move on the screen. In order to avoid an enormous amount of labor in making the numerous pictures of the series it is customary to include therein only a representation of the moving body and to superpose these detail pictures in succession upon a base picture representing the background. As each detail picture is placed upon the base picture it is photographed.

The main object of the present invention is to provide a thoroughly practicable and commercially profitable method whereby the moving object of an animated picture may be represented as moving across a natural photographed background.

Another object of the invention is to provide an improved method for introducing the said pictures of the animated or moving object into the base or background pictures.

In the drawings:

Fig. 1 is a face view of a section of base or background film used in carrying out my method;

Fig. 2 shows several drawings forming a part of a series representing the moving object in different positions;

Fig. 3 shows several silhouette pictures of the moving object forming part of a corresponding series;

Fig. 4 is a diagrammatic illustration of a photographing operation forming one step in the method;

Fig. 5 is an enlarged edge view of a section of the two films used in said photographing operation;

Fig. 6 is a view of a section of negative film which has been partially exposed by said operation;

Fig. 7 is a diagrammatic illustration of a second photographing operation forming another step in the method;

Fig. 8 is a view of a section of the negative film after it has been exposed by said second photographing operation;

Fig. 9 is a view similar to Fig. 7 illustrating a photographing operation which forms part of a modified method;

Fig. 10, a view of two superposed negative films used in said modified method; and Fig. 11 is an edge view of said superposed films.

In carrying out my preferred method of producing animated pictures, the various steps of which method are illustrated in Figs. 1 to 9 inclusive, I first make or select a base sheet 1 which contains the background across which it is planned to have the object of the animated picture travel. In the present instance the sheet 1 is in the form of a motion picture film containing a series of pictures of the background. This film may be made especially to suit the object which is to appear in the picture, or a previously made film may be selected and the object pictures executed with reference to it. Having made or selected the film 1, a series of drawings or other representations of the object in motion are made upon a series of sheets 2, $2^a$ and $2^b$, of relatively large size. The picture areas of the sheets 2 are similar in form to the picture areas of the film 1 and the object pictures are made upon said sheet areas with proper reference to the background pictures upon the film. The object is represented in different advanced positions upon successive sheets and is proportioned and located so as to appear upon the background picture and move across it in a manner to produce the effect planned for the complete animated picture. The entire picture area of each sheet 2, surrounding the object, is made black to provide a light-absorbing background for the object.

Upon a series of sheets 3, $3^a$ and $3^b$, of the same size and shape as the sheets 2, $2^a$ and $2^b$, a series of silhouettes of the object are made. There is one of these sheets for each sheet 2 and the silhoutte upon each corresponds precisely in size, form and location to the picture of the object upon its companion sheet 2. Sheet 3 corresponds to sheet 2; sheet 3ª corresponds to sheet 2ª; sheet 3ᵇ corresponds to sheet 2ᵇ, and so on, throughout the series. The area of the silhouette is made black to render it light-absorbing and a white field or background surrounds the silhouette and extends over the remaining picture area of the sheet.

The base film 1 is superposed upon an unexposed negative film 4, with its emulsion face in contact with the emulsion face of the latter film, as shown in Fig. 5. These superposed films are wound upon a reel and inserted into a camera, diagrammatically represented at 5 in Fig. 4. Within the camera the films are together trained past the rear of the camera lens to a take-up reel, the film 1 being disposed over the front of the film 4 and interposed between the latter film and the lens. The first sheet 3 of the series of silhouette pictures is then placed at the proper focal distance from the lens and in proper alinement with the lens and with the films back of the lens, as shown in Fig. 4, and the camera is operated to photograph said sheet. Provision is made for illuminating the sheet well during the photographing operation. When the camera shutter is opened for an exposure the white background or field of the sheet 3, surrounding the silhouette, will reflect said illumination through the lens and through the transparent base film 1 to the negative film 4 directly back of the base film. This light, passing through the film 1, will project or print one of the background pictures thereon directly upon a corresponding area of the negative film 4. Not all of this background picture, however, will be projected upon the negative film. The area of the photographed sheet 3 occupied by the silhouette is light-absorbing and practically no light will be reflected to the lens and to the films 1 and 4 from the silhouette. Consequently the picture area of the film 4 will be left with an unexposed portion bearing the same relations in shape and location to the remainder of said area as the silhouette bears to the area of the sheet 3. After an exposure the films 1 and 4 are advanced the length of one picture area and the next sheet 3ª of the series is placed in position and photographed. When all of the sheets in the series have in this manner been photographed in succession the two films are removed from the camera and the negative film 4 is separated from the film 1.

A section of the partially exposed negative sheet is shown in Fig. 6, the unexposed spaces being designated S. This film is next wound upon a reel, returned alone to the camera, and trained past the lens as formerly. The picture sheets 2, 2ª and 2ᵇ are now placed successively in proper sequence before the camera as shown in Fig. 7, and photographed precisely as were the sheets 3, 3ª and 3ᵇ. The object drawings upon these sheets 2 are proportioned and located with reference to the area of the sheets precisely as are the silhouettes and the unexposed film spaces S with reference to the picture areas upon the sheets 3 and the film 4 respectively. Each sheet 2 is placed before the camera in exactly the same relative position formerly occupied by its companion sheet 3, and the corresponding picture area of the film 4 is registered with the camera lens. When the camera shutter is opened, therefore, light rays reflected from the object picture upon the sheet 3 will project said picture upon the space S. The black, light-absorbing field surrounding the object picture will reflect practically no light through the lens and the previous exposure upon the film 4 will not be affected. The series of sheets 2 are successively photographed in the same order as the companion sheets 3 and the film 4 is advanced through the camera step by step, as formerly, to receive the successive object pictures within the unexposed spaces S of its respective picture areas. Fig. 8 shows a section of the completely exposed negative film in which the spaces S have been accurately filled by pictures of the object. This complete negative film is developed and a positive film is printed from it. When said positive film is projected the object will appear to move across the natural photographed background furnished by the original film 1.

In the method just described the complete pictures are formed upon a single negative film 4. In my modified method I employ two superposed films to make a complete negative. The first steps of this latter method are exactly the same as those of the first method. The base film 1 is selected and the picture sheets 3 are successively photographed upon the film 4 through the base film 1 as shown in Fig. 4. This leaves the unexposed spaces S upon the negative 4 as formerly. This negative is now developed, however, and the unexposed emulsion is washed from the spaces S. An entirely unexposed negative film 6 (see Fig. 9) is next placed in the camera and the sheets 2 are photographed upon it successively. This negative film will contain pictures of the moving objects only. After exposure to the series of pictures 2 it is removed from the camera and developed. The developed film is next superposed upon the film 4, as shown in Figs. 10 and 11 so that the object pictures upon the film 6 accurately register with the proper clear spaces of the film 4. A positive print is finally made from these superposed films upon another film for projection.

What I claim is:

1. The method of producing negative films for animated pictures, consisting in selecting a transparent picture film containing a series of base pictures photographed upon it; manually executing on sheet material adapted to be positioned in front of a camera a series of pictures of a moving object in different positions upon a materially larger scale than the base pictures and providing each with a dark, blank background; manually executing a corresponding companion series of dark silhouette pictures of the object of the same size as said object pictures and in the same respective positions on sheet material and providing each with a light blank background; placing the said base picture film and an unexposed negative film in a camera with the base film in front of the negative film and both back of the camera lens; placing said silhouette pictures successively in front of the camera lens and photographing them in reduced size upon the negative film through successive picture areas of the transparent base picture film, and simultaneously printing the base pictures by reflection of light from the light, blank backgrounds of the silhouette pictures, whereby the base pictures will be projected upon the negative film with a portion of each negative picture area corresponding in outline with the dark silhouette, left unexposed; removing the base film from in front of the negative film; and placing the pictures of the object with the dark background successively in front of the camera lens and photographing them in reduced size upon said unexposed portion of successive picture areas upon the negative film.

2. The method of producing negative films for animated pictures, consisting in selecting a transparent picture film containing a series of base pictures photographed upon it; making a series of pictures of a moving object in different positions upon a materially larger scale than the base picture and providing each with a dark blank background; making a corresponding series of large, dark silhouette pictures of the object in the same respective positions as the object pictures and upon the same scale, each with a light, blank background; placing the said base picture film and an unexposed negative film in a camera with the base film in front of the negative film and both back of the camera lens; placing said silhouette pictures successively in front of the camera lens and photographing them in reduced size upon the negative film through successive picture areas of the transparent base picture film, and simultaneously printing the base pictures by reflection of light from the light, blank backgrounds of the silhouette pictures, whereby the base pictures will be projected upon the negative film with a portion of each negative picture area corresponding in outline with the dark silhouette, left unexposed; removing the base film from in front of the negative film; and placing the pictures of the object with the dark background successively in front of the camera lens in the same positions with relation to the camera as those previously occupied by their companion silhouette pictures and photographing them in reduced size upon said unexposed portion of successive picture areas upon the negative film.

3. The method of producing a negative film consisting in selecting a transparent picture film containing a base picture photographed upon it; manually executing on sheet material adapted to be positioned in front of a camera, a picture of an object upon a materially larger scale than the base picture, and providing said picture with a dark, blank background; manually executing a corresponding companion dark silhouette picture of the object of the same size as said object picture and in the same respective position, and providing said silhouette with a light, blank background; placing the said base picture film and an unexposed negative film in a camera with the base film in front of the negative film and both back of the camera lens; placing said silhouette picture in front of the camera lens and photographing it in reduced size upon the negative film through the picture area of the transparent base picture film, and simultaneously printing the base picture by reflection of light from the light, blank background of the silhouette picture, whereby the base picture will be projected upon the negative film with a portion of the negative picture area corresponding in outline with the dark silhouette, left unexposed; removing the base film from in front of the negative film; and placing the picture of the object with the dark background in front of the camera lens and photographing it in reduced size upon and to entirely occupy said unexposed portion of the picture area upon the negative film.

4. The method of producing negative films for animated pictures, consisting in selecting a transparent picture film containing a series of base pictures photographed upon it; manually executing a series of pictures of a moving object in different positions upon a materially larger scale than the base pictures, and providing each with a dark, blank background; manually executing a corresponding companion series of dark silhouette pictures of the object, of the same size as said object pictures and in the same respective positions and providing each with a light blank background; placing the said base film and an unexposed negative film in a camera with the base film in front of the negative film and both back of the camera lens; placing said silhouette pictures successively in front of the camera lens and photographing them in reduced size upon the negative film through successive picture areas of the transparent base picture film, and simultaneously printing the base pictures by reflection of light from the light, blank backgrounds of the silhouette pictures, whereby the base pictures will be projected upon the negative film with a portion of each negative picture area corresponding in outline with the dark silhouette, left unexposed; and then placing the pictures of the object with the dark background successively in front of the camera lens and making photographic reproductions of them of reduced size to accurately fill said unexposed areas of the negative film.

5. The method of producing negative films for animated pictures consisting in selecting a transparent film containing a series of base pictures photographed upon it; placing said base picture film and an unexposed negative film in a camera with the base film in front of the unexposed film and both back of the camera lens; successively placing in front of the camera lens a series of dark silhouette pictures representing a moving object in different positions upon a materially larger scale than the base pictures and with a light, blank background; photographing said silhouette pictures in reduced size upon the negative film through successive picture areas of the transparent base picture film, and simultaneously printing the base pictures by reflection of light from the light, blank background areas of the silhouette pictures, whereby the base pictures will be projected upon the negative film with a portion of each negative picture area corresponding in outline with the dark silhouette left exposed; removing the base film from in front of the negative film; and successively placing in front of the camera lens a series of pictures of an object with a dark background and similar in size, outline and position to the silhouette pictures, and photographing them upon said unexposed areas of the negative film.

In testimony whereof I hereunto affix my signature.

FRANK LYLE GOLDMAN.